Feb. 10, 1948.     M. O. ENGSETH     2,435,647
GREASE GUN
Filed Feb. 21, 1945     2 Sheets-Sheet 1
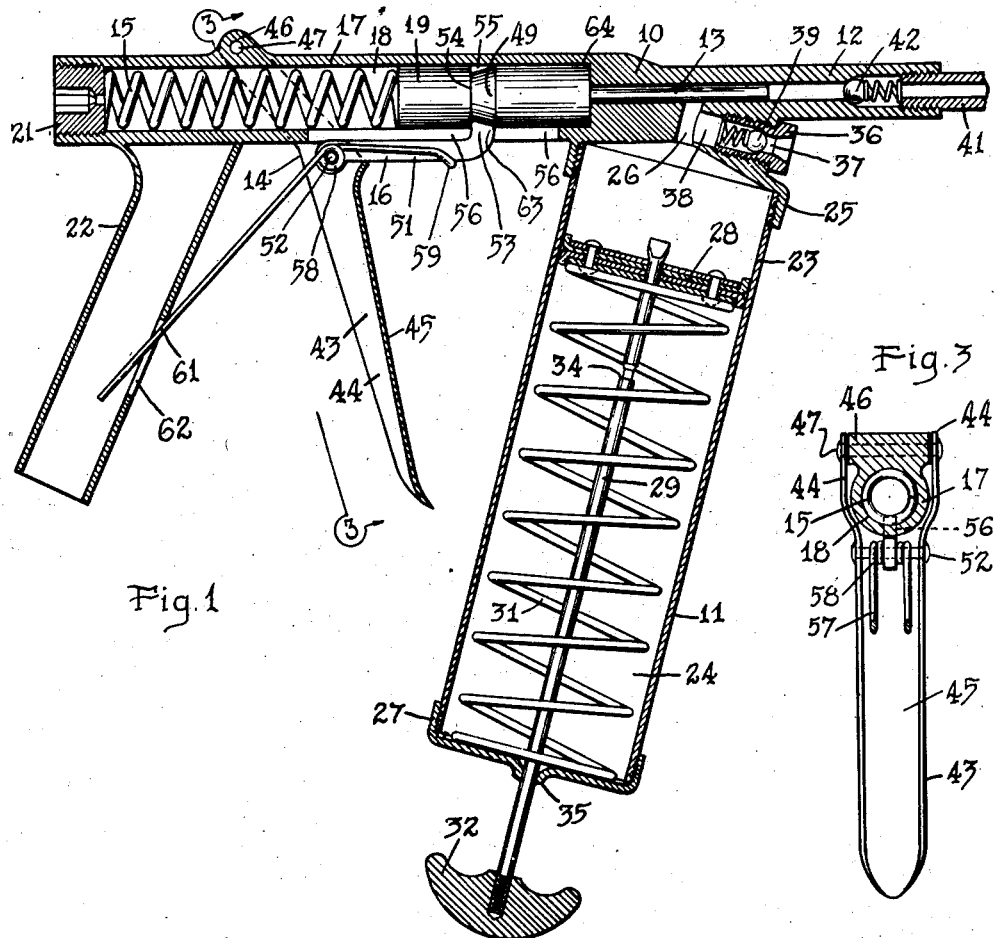
Fig. 1
Fig. 3
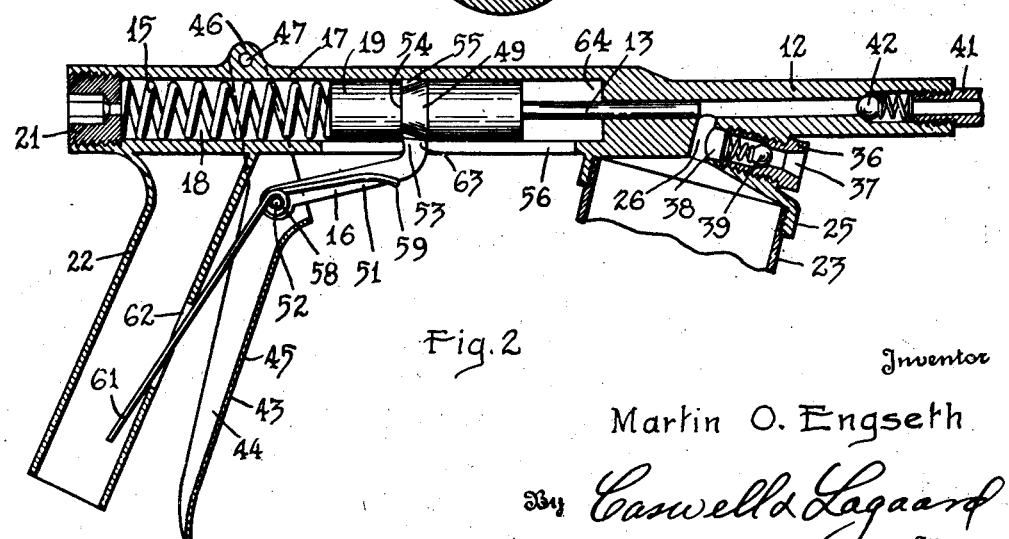
Fig. 2
Inventor
Martin O. Engseth
By Caswell & Lagaard
Attorney

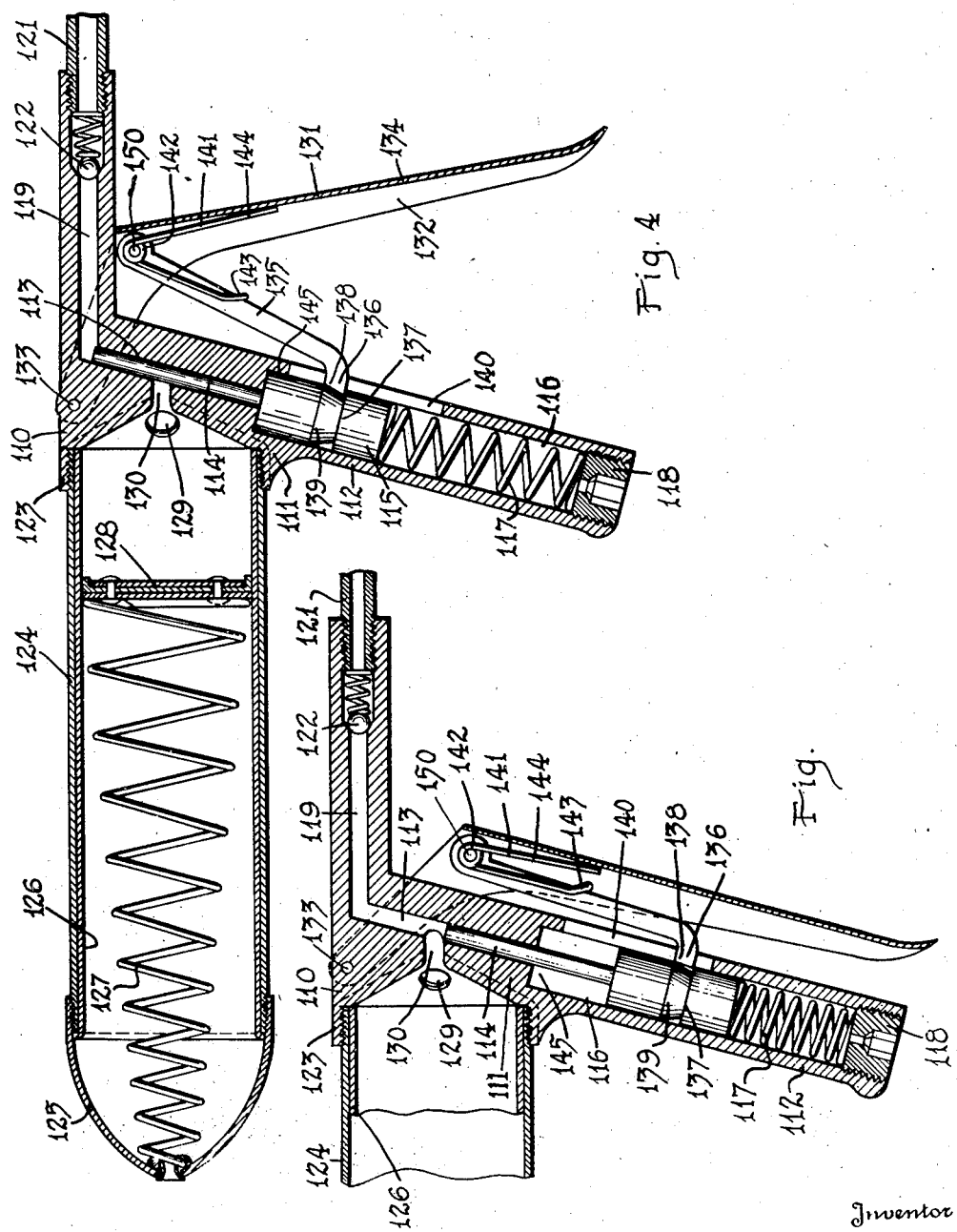

Patented Feb. 10, 1948

2,435,647

UNITED STATES PATENT OFFICE 2,435,647

GREASE GUN

Martin O. Engseth, Minneapolis, Minn.

Application February 21, 1945, Serial No. 579,039

10 Claims. (Cl. 103—153)

My invention relates to grease guns and has for an object to provide a grease gun by means of which high pressure can be procured through manual manipulation.

Another object of the invention resides in providing a grease gun operating on the principle of impact.

A still further object of the invention resides in providing a grease gun having a cylinder and piston therein, together with resilient means for urging the piston for movement along the cylinder to create a pressure in the cylinder.

Another object of the invention resides in providing a retracting mechanism for retracting the piston and compressing the resilient means and in still further providing release means for releasing the piston after the resilient means has been sufficiently compressed.

An object of the invention resides in providing a lever for retracting the piston and in providing the lever with a catch for engagement with a part movable with the piston and in constructing the release means to disengage the catch when the piston is fully retracted and the resilient means compressed.

Another object of the invention resides in providing cushioning means for retarding the movement of the piston near the end of its pressure stroke.

Other objects of the invention reside in the novel combination and arrangement of parts and in the details of construction hereinafter illustrated and/or described.

In the drawings:

Fig. 1 is an elevational longitudinal sectional view of a grease gun illustrating an embodiment of my invention and showing the piston in extended position.

Fig. 2 is a view similar to Fig. 1 of a portion of the structure shown therein and illustrating the arrangement of the parts when the piston is in retracted position.

Fig. 3 is a cross sectional view taken on line 3—3 of Fig. 1.

Fig. 4 is a view similar to Fig. 1 of a modification of the invention.

Fig. 5 is a view similar to Fig. 2 of the structure shown in Fig. 4.

In the use of grease guns, it becomes desirable to be able to exert a considerable amount of pressure on the grease frequently as much as five thousand pounds per square inch. To procure this high pressure, it has heretofore been the custom to maintain the grease under such pressure within a container by air pressure. Such equipment requires electrically operated pumps and other elaborate equipment. Other devices in which high pressure has been attempted to be procured by manual manipulation have been exceedingly cumbersome, due to excessive movement of the operating parts required to produce the pressure or due to the use of screws or similar devices. The present invention provides a simple construction whereby the high pressures necessary are easily procured in a natural and simple manner by simply manipulating an easily operated lever and without the use of extensive and elaborate equipment.

The form of my invention shown in Figs. 1, 2 and 3 comprises a body 10 in which the operating parts of the device are disposed and to which is attached a receptacle 11 for the lubricant. In the body 10 is formed a cylinder 12 in which a piston 13 is slidable. This piston is adapted to be retracted by a retracting mechanism 14 carried by the body 10 which compresses a compression coil spring 15. Upon release of the spring 15 by means of a release mechanism 16, the said spring forces the piston 13 to travel along the cylinder 12 and to compress the lubricant within said cylinder and discharge the same into the lubricating fitting or other device into which the lubricant is to be forced. The various parts forming the instant invention will now be described in detail.

The body 10 of the grease gun consists of a casting generally tubular in form which has a bore therein forming the cylinder 12 previously referred to and which extends throughout a portion of the length thereof. The cylinder 12 is of rather small dimensions, so that when the piston 13 is forced along the same, suitable pressure can be procured within said cylinder. The body 10 has a rearward portion 17 which is formed with a bore 18 concentric with and lying in continuation of the bore forming cylinder 12. The bore 18 is of considerably greater diameter than the cylinder 12 and receives the compression spring 15. Slidably mounted in the bore 18 is a plunger 19 which is attached to the piston 13. The spring 15 bears at one end against the plunger 19 and at its other end against a plug 21 screwed into the end of the portion 17 of body 10. The body 10 has attached to it a handle 22 which may be cast integral therewith or attached to the body in any suitable manner.

The receptacle 11 consists of a tube 23 having a cylindrical chamber 24 extending throughout the length thereof. One end of the tube 23 is screwed into a threaded boss 25 cast as a part of the body 10. This boss has a passageway 26 therein which communicates with the cylinder 12 intermediate the length thereof and with the cylindrical chamber 24 in tube 23. A cap 27, screwed upon the other end of the tube 23, closes such end of the same. Slidably mounted within the cylindrical chamber 24 is a piston 28 of any suitable construction which is attached to a piston rod 29. The said rod extends though the cap 27 and has attached to its outer end a knob 32 by means of which the piston may be manually manipulated. A compression coil 31 disposed within the cylindrical chamber 24 bears against the piston 28 and against the cap 27 and tends to urge the piston for movement toward the body 10 of the grease gun and to force the lubricant within the cylindrical chamber 24 ahead of piston 28 through passageway 26 and into the cylinder 12.

The receptacle 11 may be filled with lubricant by removing the tube 23 from the boss 25 and inserting the open end of the tube 23 into the lubricant. Upon then drawing the piston 28 inwardly into the cylinder and against the action of the spring 31, the chamber 24 ahead of the piston may be filled with lubricant. To temporarily hold the charge of lubricant within the cylinder, a shoulder 34 is formed on the piston rod 29 which is adapted to engage a shoulder 35 on the cap 27 when the piston rod is moved laterally. The tube 23 with its charge of lubricant is then screwed back into the boss 25 and upon disengagement, the grease gun is ready to be used.

Where lubricant under pressure is available, the receptacle 11 may be filled without removing the tube 23 from the boss 25. For this purpose, a fitting 36 is employed which may be connected to a source of lubricant. This fitting is screwed into the body 10 at a locality between the cylinder 12 and the boss 25 and has a passageway 37 through the same which communicates with a passageway 38 in the said body which, in turn, communicates with the passageway 26 previously mentioned. A check valve 39 within the fitting 36 permits the flow of lubricant into the receptacle, but restrains the flow of lubricant out of the same. When the receptacle 11 is to be filled, the fitting 36 is connected to the source of lubricant and the lubricant flows past the check valve 39 and into the portion of the chamber 24 ahead of piston 28. This causes the piston to move toward the cap 27 and to compress the spring 31.

The cylinder 12 of body 10 has screwed into the end of the same a fitting 41 by means of which the lubricant may be directed to the desired locality. This fitting may be of any of the standard fittings now used for lubrication purposes or the same may be merely a tube or pipe leading the lubricant to the desired locality. Between the fitting 41 and the bore 12 is provided a check valve 42 which permits the flow of lubricant from the cylinder 12 and into the fitting 41, but which restricts flow of lubricant or air in the opposite direction.

The retracting mechanism 14 consists of a lever 43 preferably constructed of sheet metal which has two spaced arms 44 straddling the extension 17 of body 10 and best shown in Figs. 1 and 2. These arms are connected together by means of a connecting portion 45 disposed at the forward portion of said handle. The two arms are pivoted to a lug 46 formed on the extension 17 by means of a pintle 47 which extends through the said arms and through the lug 46. Lever 43, when in its extended position, is disposed as shown in Fig. 1 and may be forced rearwardly toward the handle 22 to a position slightly past that illustrated in Fig. 3.

The release mechanism 16 consists of a catch 51 which extends through the space between the two arms 44 of lever 43 and is pivotally mounted on a pintle 52 extending through said arms. This catch has a finger 53 at the end of the same which is adapted to engage a radially extending shoulder 54 on the plunger 19 which shoulder is formed by constructing the said plunger with a V-shaped groove 55 extending about the same. The groove 55 also forms an annular abutment 49 on said plunger which serves a purpose to be presently described in detail. The finger 53 has a fulcrum 63 which, when the parts are arranged as shown in Fig. 1, engages the abutment 49. The catch 51 operates in a groove 56 formed in the under side of the extension 17 of body 10 and communicates with the bore 18. The finger 53 is urged into engagement with the shoulder 54 by means of a spring 57. This spring, intermediate the ends thereof, is looped about the pintle 52, as indicated at 58. The end 59 of this spring is hooked under the catch 51, while the other end 61 of said spring extends through hole 62 in the handle 22 and is anchored to said handle. The spring 57 also serves to urge lever 43 for movement from the position shown in Fig. 3 to that shown in Fig. 1. When the lever 43 is moved toward the handle 22, finger 53 engages the shoulder 54 and draws the plunger 19 rearwardly against the action of the spring 15. The location of the pintle 52 is such that when the lever 43 moves toward the handle 22 the said pintle moves downwardly. This swings the catch 51 which causes the fulcrum 63 of the catch 51 to be urged against the abutment 49 and the finger 53 to be gradually withdrawn from engagement therewith. Such movement continues until the parts reach a position such as shown in Fig. 2. During such movement of the plunger 19 and piston 13, said piston is retracted from the cylinder 12 and a vacuum created therein. As soon as the piston 13 passes the passageway 26, the vacuum created in the bore of cylinder 12, aided by the pressure produced by the spring 3, causes the lubricant in the portion of the chamber 24 ahead of the piston to fill the cylinder 12 ahead of the piston 13. Further movement of the lever 43 causes the finger 53 to become disengaged from the shoulder 54 and to free the plunger 19. Spring 15 then forces the plunger 19 forwardly, causing piston 13 to travel along the cylinder 12 and to compress the lubricant therein and discharge the same past the valve 42, and into the fitting 41.

The groove 56, in the portion 17 of body 10, falls short of the end of the bore 18 adjacent the cylinder 12. This provides a pocket 64 into which the end of the plunger 19 is directed. The plunger 19 fits sufficiently closely within the bore 18 so that the said pocket forms a cylinder and the end of the plunger 19 a piston. By means of this construction, a cushion is provided for absorbing the shock occasioned by the rapid travel of the plunger 19 and piston 13.

The use of the invention is obvious. Each time the lever 43 is moved toward the handle 22, the plunger 19 and piston 13 are retracted and released. The charge of lubricant is each time drawn into the cylinder 12 and ejected into the fitting 41. The device operates on the principle of impact and the plunger 19, which is relatively heavy as compared to the piston 13, acts in the manner of a hammer to force the lubricant into the fitting. I have found that by successively manipulating the retracting mechanism, pressures up to five thousand pounds per square inch can be procured with a device constructed in accordance with my invention. When it becomes desirable to refill the receptacle 11, the same can be accomplished by applying the fitting 36 to a source of lubricant under pressure or the tube 23 may be unscrewed from the boss 25 and manually filled as previously described.

In Figs. 4 and 5, I have shown a modification of the invention. In this form of the invention, a body 110 is employed which has a laterally projecting portion 111 formed at its extreme end with a handle 112. The portion 111 has a bore forming a cylinder 113 of small diameter which corresponds to the cylinder 12 of the other form of the invention. In this cylinder is slidably mounted a piston 114 which has attached to it a plunger 115. Plunger 115 slides in a bore 116 in the handle 112 and is urged toward the cylinder 113 by means of a compression coil spring 117. This spring is seated at one end against the plunger 115 and at its other end against a plug 118 screwed into the end of handle 112. The cylinder 113 communicates with a passageway 119 formed in the body 110. The body 110 has secured to it a fitting 121 which communicates through a check valve 122 with the passageway 119.

Rearwardly of the transverse portion 111 of body 110 is provided a boss 123 which is threaded to receive a receptacle 124 for the lubricant. This receptacle has a cap 125 secured to the end of the same. In the form of the receptacle shown in Figs. 4 and 5, a cartridge 126 is employed which contains the desired lubricant. This cartridge is inserted into the receptacle 124 and is removed therefrom when empty. For ejecting the lubricant from the receptacle 124, a compression coil spring 127 is employed which is attached at one end to the cap 125 and at its other end to a piston 128 slidable along the interior of the cartridge 126. The interior of the receptacle 124 communicates through a passageway 130 with the cylinder 113.

The receptacle 124 may be filled with lubricant in the same manner as the other form of the invention. For this purpose, a fitting 129 is employed identical with the fitting 36 which is screwed into the boss 123 and communicates with the interior of the receptacle 124. Due to the similarity of these devices, the fitting 129 has not been shown in detail in the drawings. If desired, however, a receptacle similar to that shown in Fig. 1 may be used instead of the one shown.

For operating the grease gun shown in Figs. 4 and 5, a lever 131 is employed which is similar in construction to the lever 43. This lever has spaced arms 132 which straddle the body 110 and are pivoted to it by means of a pintle 133 extending jointly through said arms and body. The arms 132 are connected together by means of a connecting portion 134 similar to the portion 45 of handle 43. The lever 131 has pivoted to it a catch 135 which is mounted on a pintle 150 extending through the arms 132 at a locality below the body 110. This arm terminates in a finger 136 which extends through a slot 140 in the handle 112 and operates in the same manner as the hook 53 on catch 51. This finger engages a shoulder 137 formed on the plunger 115. The catch 135 is constructed with a fulcrum 138 which engages an abutment 139 also formed on the plunger 115. The lever 131 and the catch 135 are urged into the position shown in Fig. 4 by means of a spring 141 having a portion 142 looped about the pintle 150. The said spring has an end 143 engaging the catch 135 and another end 144 engaging the portion 134 of lever 131. Spring 141 operates to urge the catch into engagement with th plunger 115 and also urges the lever 131 away from the handle 112.

The slot 140 in handle 112 terminates short of the end of the bore 116 to form a pocket 145 similar to the pocket 64 of the other form of the invention, which provides a cushion for cushioning the action of the plunger 115.

The operation of the form of the invention shown in Figs. 4 and 5 is similar to the operation of the device shown in Figs. 1 and 2. The fulcrum 138 rocks on the abutment 139 and withdraws the finger 136 from engagement with the shoulder 137 as the lever is drawn toward the handle 112. In the same manner, grease is drawn into the bore 113 and discharged through the fitting 121 when the plunger is released.

The advantages of my invention are manifest. An extremely simple and practical construction is provided serviceable for all general greasing problems. The device does not require extensive equipment for operation or for filling. Extremely high pressures can be procured by simple manipulation. The device can be constructed at a reasonable expense. My invention will function for an appreciable period of time without repair.

Changes in the specific form of my invention, as herein described, may be made within the scope of what is claimed without departing from the spirit of my invention.

Having described my invention, what I claim as new and desire to protect by Letters Patent is:

1. In a grease gun, a body providing a cylinder, a piston slidable along said cylinder, a guide carried by said body, a plunger for operating said piston, and movable along said guide, resilient means acting on said plunger and being adapted to urge the plunger for movement along said guide and said piston for movement along said cylinder and to be retracted upon movement of the plunger in the opposite direction, a shoulder formed on said plunger, a lever pivoted relative to said body, retracting means on said lever for engaging said shoulder to cause the plunger to retract the resilient means upon movement of the lever in one direction and means for disengaging said plunger from said retracting means upon retraction of said resilient means.

2. In a grease gun, a body having a bore therein providing a cylinder, means for directing lubricant into said bore, a second bore in said body concentric with said first bore and of larger dimensions, a piston slidable along said cylinder, a plunger attached to said piston and slidable along said second bore, a plug in the end of said second bore, a compression coil spring acting between said plug and plunger for urging said piston for movement along said cylinder, said body having a slot therein communicating with said second bore, retracting means operable through said slot for retracting said piston and plunger and compressing said spring and releasing means for releasing said piston and said plunger from engagement with said retracting means.

3. In a grease gun, a body having a bore therein providing a cylinder, means for directing lubricant into said bore, a second bore in said body concentric with said first bore and of larger dimensions, a piston slidable along said cylinder, a plunger attached to said piston and slidable along said second bore, a plug in the end of said second bore, a compression coil spring acting between said plug and plunger for urging said piston for movement along said cylinder, said body having a slot therein communicating with said second bore, a lever pivoted to said body, a catch pivoted to said lever and operable through said slot, a shoulder formed on said plunger and engageable by said catch and releasing means for disengaging said catch from said shoulder upon retraction of said spring.

4. In a grease gun, a body having a bore therein providing a cylinder, means for directing lubricant into said bore, a second bore in said body concentric with said first bore and of larger dimensions, a piston slidable along said cylinder, a plunger attached to said piston and slidable along said second bore, a plug in the end of said second bore, a compression coil spring acting between said plug and plunger for urging said piston for movement along said cylinder, said body having a slot therein communicating with said second bore, a lever pivoted to said body, a catch pivoted to said lever and operable through said slot, a shoulder formed on said plunger, a finger formed on said catch and engageable with said shoulder, a fulcrum formed on said catch and an abutment on said plunger engageable with said fulcrum and serving to swing said finger out of engagement with said shoulder upon manipulation of said lever to release said plunger and piston.

5. In a grease gun, a body having a bore therein providing a cylinder, means for directing lubricant into said bore, a second bore in said body concentric with said first bore and of larger dimensions, a piston slidable along said cylinder, a plunger attached to said piston and slidable along said second bore, a plug in the end of said second bore, a compression coil spring acting between said plug and plunger for urging said piston for movement along said cylinder, said body having a slot therein communicating with said second bore, a lever pivoted relative to said body, a catch pivoted to said lever and operable through said slot, the pivot for said catch being disposed in proximity to said body at the locality of said slot, the pivot for said lever being so disposed that the pivot for said catch moves in a direction away from said body upon retraction of said lever, a shoulder on said plunger, an abutment adjoining said shoulder, a finger on said catch for engagement with said shoulder and a fulcrum on said catch for engagement with said abutment, said fulcrum moving the finger out of engagement with said shoulder upon retraction of said lever and the swinging of the pivot for said catch away from the body.

6. In a grease gun, a body providing a cylinder, a piston slidable along said cylinder, a guide carried by said body, a plunger for operating said piston, and movable along said guide, resilient means acting on said plunger and being adapted to urge the plunger for movement along said guide and said piston for movement along said cylinder and to be retracted upon movement of the plunger in the opposite direction, a shoulder formed on said plunger, a movable member adapted to engage said shoulder and upon movement to retract said resilient means, manually operated means for moving said movable member, and means for disengaging said member from said shoulder after retraction of the resilient means.

7. In a grease gun, a body providing a cylinder, a piston slidable along said cylinder, reciprocable means movable with said piston, a shoulder formed on said reciprocable means, retractable resilient means adapted to urge the piston for movement along said cylinder, a movable member adapted to engage said shoulder and upon movement to retract said resilient means, manually operated means for moving said member, and means for disengaging said member from said shoulder after retraction of the resilient means.

8. In a grease gun, a body providing a cylinder, a piston slidable along said cylinder, reciprocable means movable with said piston, a shoulder formed on said reciprocable means, retractable resilient means adapted to urge the piston for movement along said cylinder, a movable member adapted to engage said shoulder, guide means for guiding said movable member for reciprocating movement in the direction of movement of said reciprocable means and for swinging movement relative the locality of engagement of said movable member with said shoulder, and release means operable upon swinging of said member for disengaging said member from said shoulder to release the piston.

9. In a grease gun, a body providing a cylinder, a piston slidable along said cylinder, reciprocable means movable with said piston, a shoulder formed on said reciprocable means, retractable resilient means adapted to urge the piston for movement along said cylinder, a movable member adapted to engage said shoulder, guide means for guiding said movable member for reciprocating movement in the direction of movement of said reciprocable means and for swinging movement relative the locality of engagement of said movable member with said shoulder, an abutment formed on said reciprocable means adjacent said shoulder and means on said movable element engaging said abutment and serving upon swinging of said movable member to disengage said movable member from said shoulder to release the piston.

10. In a grease gun, a body providing a cylinder, a piston slidable along said cylinder, reciprocable means movable with said piston, said reciprocable means having a groove therein forming a shoulder and an angularly disposed abutment, retractable resilient means adapted to urge the piston for movement along said cylinder, a movable member, a catch thereon adapted to engage said shoulder, guide means for guiding said movable member for reciprocating movement in the direction of movement of said reciprocable means and for swinging movement relative to the locality of engagement of said catch with said shoulder and a fulcrum formed on said movable member and adapted to engage said abutment to move said catch out of engagement with the shoulder upon swinging of said movable member.

MARTIN O. ENGSETH.

REFERENCES CITED

The following references are of record in the file of this patent:

UNITED STATES PATENTS

| Number | Name | Date |
|---|---|---|
| 1,259,463 | DeFir | Mar. 12, 1918 |
| 1,976,903 | Tear | Oct. 16, 1934 |
| 2,151,676 | Appleby | Mar. 28, 1939 |